US012730411B2

(12) United States Patent
Kahrobaiyan

(10) Patent No.: US 12,730,411 B2
(45) Date of Patent: Sep. 8, 2026

(54) FLEXIBLE GUIDE WITH ADJUSTABLE TRANSLATION TABLE FOR ROTARY RESONATOR MECHANISM, IN PARTICULAR OF A HOROLOGICAL MOVEMENT

(71) Applicant: The Swatch Group Research and Development Ltd, Marin (CH)

(72) Inventor: Mohammad Hussein Kahrobaiyan, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 1252 days.

(21) Appl. No.: 17/449,674

(22) Filed: Oct. 1, 2021

(65) Prior Publication Data

US 2022/0137561 A1 May 5, 2022

(30) Foreign Application Priority Data

Oct. 29, 2020 (EP) .................................... 20204754

(51) Int. Cl.
*G04B 17/32* (2006.01)
*G04B 17/06* (2006.01)

(52) U.S. Cl.
CPC ........... *G04B 17/32* (2013.01); *G04B 17/063* (2013.01)

(58) Field of Classification Search
CPC ...... G04B 17/04; G04B 17/063; G04B 17/10; G04B 17/32; G04B 17/045
See application file for complete search history.

(56) References Cited

U.S. PATENT DOCUMENTS 11,175,630 B2 * 11/2021 Winkler .................. G04C 3/04
11,454,932 B2 * 9/2022 Di Domenico ........ G04B 31/06
(Continued)

FOREIGN PATENT DOCUMENTS

CH 714 992 A1 11/2019
CN 106896699 A 6/2017
(Continued)

OTHER PUBLICATIONS

European Search Report issued Mar. 9, 2021 in European Application 20204754.4 filed on Oct. 29, 2020, 3 pages (with English Translation of Categories of Cited Documents).
(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A flexible guide for a rotary resonator mechanism, in particular of a horological movement, the guide including a fixed support, an element movable relative to the fixed support, at least one main flexible strip allowing the movable element to move relative to the fixed support by bending the main flexible strip(s) in a rotary movement about a centre of rotation, the flexible guide being arranged substantially in a plane, and includes at least a first translation table joined to one end of the main flexible strip, so that the first translation table is configured to move in translation at least in part under the effect of the bending of the main flexible strip, the flexible guide including a device for adjusting the rigidity of the first translation table.

19 Claims, 5 Drawing Sheets

(56) References Cited

U.S. PATENT DOCUMENTS

| | | | | |
|---|---|---|---|---|
| 2020/0150595 | A1* | 5/2020 | Winkler | G04B 17/045 |
| 2020/0241476 | A1 | 7/2020 | Musy et al. | |

FOREIGN PATENT DOCUMENTS

| | | | |
|---|---|---|---|
| CN | 108475039 | A | 8/2018 |
| CN | 108693761 | A | 10/2018 |
| CN | 111474843 | A | 7/2020 |
| EP | 2 273 323 | A2 | 1/2011 |
| EP | 2 273 323 | A3 | 1/2011 |
| EP | 3 054 356 | A1 | 8/2016 |

OTHER PUBLICATIONS

Thalmann, "Flexure Pivot Oscillators for Mechanical Watches" In: "Flexure Pivot Oscillators for Mechanical Watches", XP055731304, Jun. 18, 2020, 125 pages.

Chinese Office Action dated Jun. 21, 2024 in corresponding Chinese Patent Application No. 202111273011.3 (with English Translation of Category of Cited Documents), 10 pages.

* cited by examiner

Fig. 8
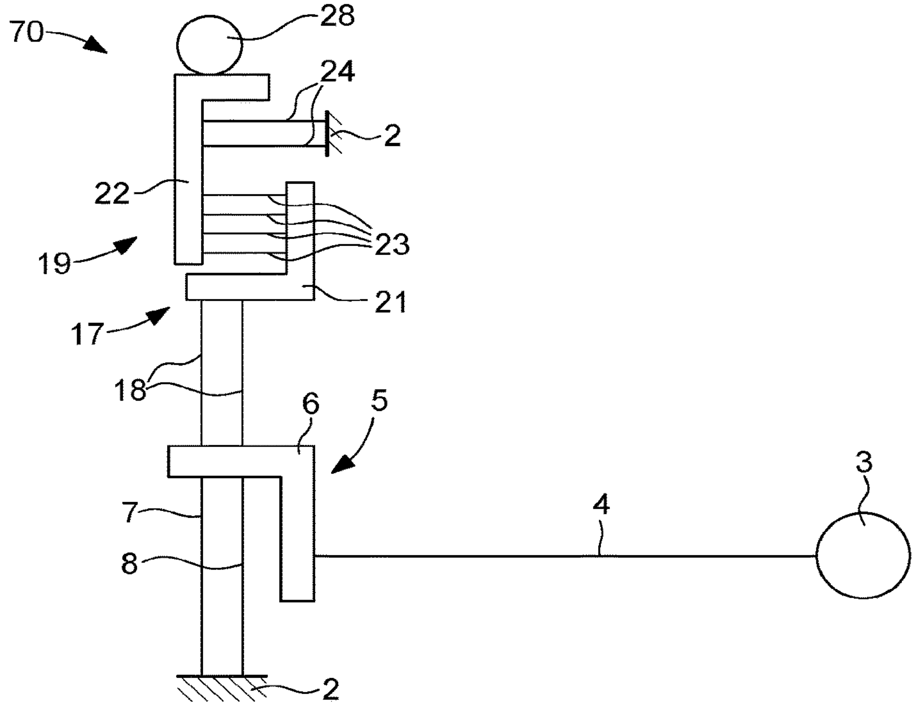
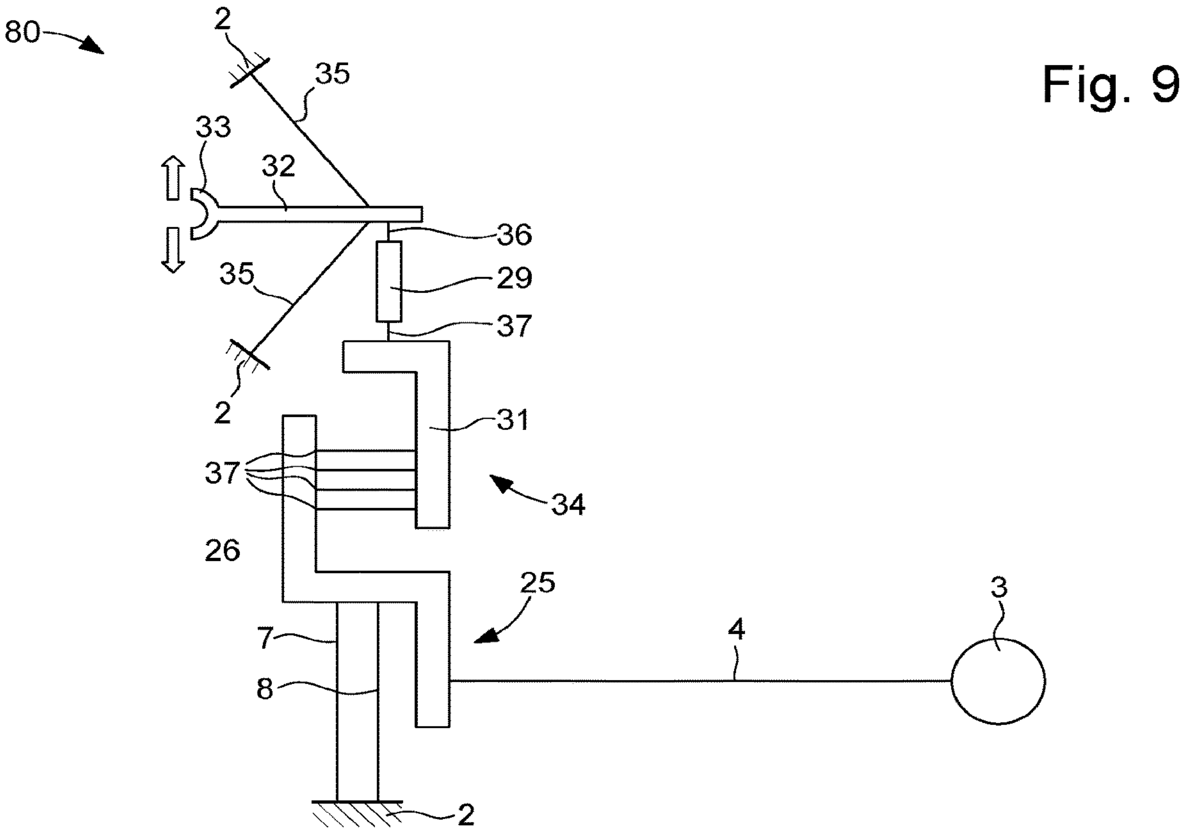
Fig. 9

FLEXIBLE GUIDE WITH ADJUSTABLE TRANSLATION TABLE FOR ROTARY RESONATOR MECHANISM, IN PARTICULAR OF A HOROLOGICAL MOVEMENT

CROSS-REFERENCE TO RELATED APPLICATION

This application claims priority to European Patent Application No. 20204754.4 filed on Oct. 29, 2020, the entire disclosure of which is hereby incorporated herein by reference.

FIELD OF THE INVENTION

The present invention relates to a flexible guide with an adjustable translation table for a rotary resonator mechanism, in particular of a horological movement. The invention also relates to a rotary resonator mechanism provided with such a flexible guide.

BACKGROUND OF THE INVENTION

Most of today's mechanical watches are equipped with a balance-spring and a Swiss lever escapement mechanism. The balance-spring forms the time base of the watch. It is also called a resonator.

The escapement, in turn, fulfils two main functions:

maintaining reciprocating movements of the resonator;

counting these reciprocating movements.

To constitute a mechanical resonator, an inertial element, a guide and an elastic return element are needed. Conventionally, a spiral spring acts as an elastic return element for the inertial element that constitutes a balance. This balance is guided in rotation by pivots which rotate in plain ruby bearings. This gives rise to friction, and therefore to energy losses and operating disturbances, which depend on the positions, and which are to be eliminated.

Today, flexible guides are used as a spring to form a virtual pivot. The flexible virtual pivot guides significantly improve timepiece resonators. The simplest are cross-strip pivots, made of two guide devices with straight strips which cross each other, generally perpendicularly. These two strips can be either three-dimensional in two different planes, or two-dimensional in the same plane and are then welded at their point of intersection.

However, when it is sought to use flexible strips to pivot a rotating annular balance in a manner similar to the movement of a balance with a spring, an isochronous movement cannot be achieved. Indeed, a perfectly periodic rotary movement of the mass cannot be achieved. The return torque is not linear, which generates an anisochronism depending on the amplitude of displacement of the mass and an error in the course of the movement.

SUMMARY OF THE INVENTION

A purpose of the invention is, consequently, to provide a flexible guide for a rotary resonator mechanism, which avoids the aforementioned problems.

To this end, the invention relates to a flexible guide for a rotary resonator mechanism, in particular of a horological movement, the guide comprising a fixed support, an element movable relative to the fixed support, at least one main flexible strip allowing the movable element to move relative to the fixed support by bending the main flexible strip(s) in a rotary movement about a centre of rotation, the flexible guide being arranged substantially in a plane.

The flexible guide is remarkable in that it comprises at least a first translation table joined to one end of the main flexible strip, so that the first translation table is configured to move in translation at least in part under the effect of the bending of the main flexible strip, the flexible guide including means for adjusting the rigidity of the first translation table.

Thanks to the invention, an isochronous flexible strip guide is obtained. Indeed, the translation table allows the main strip to move when it is bent, and the adjustment means allow the rigidity of the translation table to be modified to adjust the isochronism of the flexible guide. Thus, a substantially constant return coefficient is maintained, so that the movement of the balance is isochronous.

According to an advantageous embodiment, the translation table comprises at least one secondary flexible strip, preferably two secondary flexible strips, and a first rigid part, the secondary flexible strip being joined by one end to the first rigid part, and by another end, either to the fixed support or to the movable element, the secondary flexible strip(s) being substantially perpendicular to the main flexible strip in the rest position of the flexible guide.

According to an advantageous embodiment, the secondary flexible strips are disposed on different lines.

According to an advantageous embodiment, the secondary flexible strips are substantially parallel.

According to an advantageous embodiment, the adjustment means comprise pins for modifying the effective length of the secondary flexible strip(s).

According to an advantageous embodiment, the adjustment means comprise a member for applying a force or a torque to a rigid part of a translation table.

According to an advantageous embodiment, the force or the torque is directed parallel to the secondary flexible strips and perpendicular to the main flexible strip in the rest position of the guide.

According to an advantageous embodiment, the force or the torque is directed perpendicular to the secondary flexible strips and parallel to the main flexible strip in the rest position of the guide.

According to an advantageous embodiment, the adjustment means comprise a second translation table arranged between the application member and the rigid part of the first translation table.

According to an advantageous embodiment, the second translation table comprises a second rigid part, and at least one tertiary flexible strip, preferably two tertiary flexible strips, connecting the second rigid part to the first rigid part of the first translation table, the tertiary strip(s) being substantially perpendicular or parallel to the main flexible strip in the rest position of the flexible guide.

According to an advantageous embodiment, the adjustment means comprise a third translation table arranged between the application member and the second rigid part of the second translation table.

According to an advantageous embodiment, the third translation table comprises a third rigid part, at least one quaternary strip, preferably two quaternary strips, connecting the second rigid part to the support, and at least one quinquennary strip, preferably four quinquennary strips, connecting the third rigid part to the second rigid part of the second translation table, the quaternary and quinquennary strips being substantially parallel to the main flexible strip in the rest position of the flexible guide.

According to an advantageous embodiment, the application member comprises an eccentric screw to press on the rigid part of the translation table.

According to an advantageous embodiment, the application member includes a movable element and a spring joining the movable element to the rigid part, the rigidity of the secondary strip being modified by the displacement of the movable support relative to the rigid part.

According to an advantageous embodiment, the spring is helical.

According to an advantageous embodiment, the application member comprises a lever and a flexible element, the lever allowing to apply a predefined force or torque to the rigid part of the translation table by means of the flexible element.

According to an advantageous embodiment, the application member includes magnets, one of the magnets being arranged on the rigid part of the translation table.

According to an advantageous embodiment, the movable element comprises the central part.

According to an advantageous embodiment, the movable element comprises a balance centred on the central part.

According to an advantageous embodiment, the rigid part forms an elbow so that strips of different type joining the rigid part of the first and second translation tables are perpendicular to each other.

The invention also relates to a pivot comprising at least two flexible guides, preferably three to be symmetrical, each guide being formed of a main strip and a translation table connected to a support, the pairs being distributed angularly around a central part, each main strip being joined by one end to the central part, at least one of the flexible guides being defined according to the invention.

According to an advantageous embodiment, the movable element comprises the central part.

According to an advantageous embodiment, the movable element comprises a balance centred on the central part.

The invention also relates to a rotary resonator mechanism, in particular for a horological movement, the mechanism including a flexible guide and/or a flexible pivot according to the invention.

BRIEF DESCRIPTION OF THE DRAWINGS

Other features and advantages of the present invention will become apparent upon reading several embodiments given only by way of non-limiting examples, with reference to the appended drawings wherein.

DETAILED DESCRIPTION OF PREFERRED EMBODIMENTS

Figure 1:
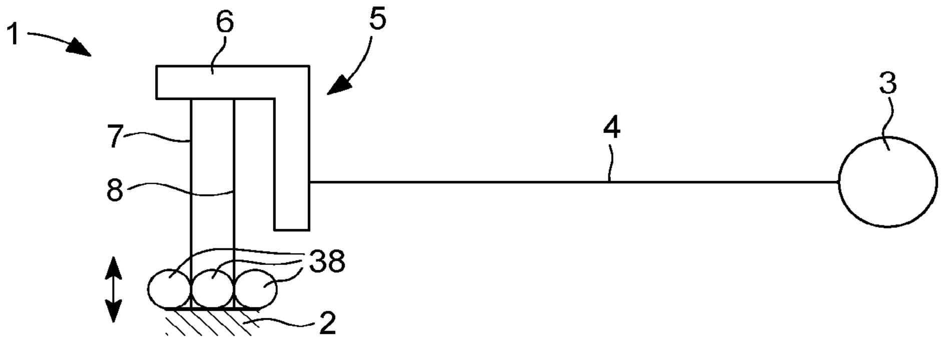
FIG. 1 schematically shows a top view of a flexible guide according to a first embodiment of the invention, FIG. 2 schematically shows a top view of the flexible guide with a balance according to a second embodiment of the invention, FIG. 3 schematically shows a top view of a flexible guide according to a first variant of the second embodiment of the invention, FIG. 4 schematically shows a top view of a flexible guide according to a second variant of the second embodiment of the invention, FIG. 5 schematically shows a top view of a flexible guide according to a third variant of the second embodiment of the invention, FIG. 6 schematically shows a top view of a flexible guide according to a third embodiment of the invention, FIG. 7 schematically shows a top view of a flexible guide according to a fourth embodiment of the invention, FIG. 8 schematically shows a top view of a flexible guide according to a variant of the fourth embodiment of the invention, FIG. 9 schematically shows a top view of a flexible guide according to a fifth embodiment of the invention, FIG. 10 schematically shows a top view of a flexible strip pivot with a balance, the pivot comprising a flexible guide according to the third variant of the second embodiment of the invention, FIG. 11 schematically shows a top view of a symmetrical flexible strip pivot comprising a flexible guide according to the first embodiment of the invention, FIG. 12 schematically shows a top view of a flexible guide according to a first variant of the third embodiment of the invention, FIG. 13 schematically shows a top view of a flexible guide according to a second variant of the third embodiment of the invention.

FIGS. 1 to 9 show a flexible guide for a rotary resonator mechanism, in particular of a horological movement. The flexible guide 1, 10, 20, 30, 40, 50, 60, 70, 80 is arranged substantially in a plane. The flexible guide comprises a fixed support 2, an element 3 movable relative to the fixed support 2 and a main flexible strip 4 connecting the movable element 3 to the support 2. The main flexible strip 4 allows the movable element 3 to move relative to the fixed support 2. By bending the main flexible strip 4, the movable element 3 can move relative to the support 2 in a rotary movement about a centre of rotation. The movable element 3 includes a circular cylinder portion.

According to the invention, the flexible guide 1, 10, 20, 30, 40, 50, 60, 70, 80 comprises a translation table 5, 15, 25 joined to one end of the main flexible strip 4. In this embodiment, the translation table 5, 15, 25 is arranged in series between the fixed support 2 and said main flexible strip 4. The translation table 5, 15, 25 is joined to the fixed support 2 and to a first end of the main flexible strip 4, the main flexible strip 4 being joined to the movable element 3 by a second end. The translation table 5, 15, 25 is configured to move in translation at least in part under the effect of the movement of the main flexible strip 4. The translation table 5, 15, 25 comprises at least one secondary flexible strip, here two secondary flexible strips 7, 8, and a rigid part 6, 16, 26. The secondary flexible strips 7, 8 are disposed on different lines. Preferably, the secondary flexible strips 7, 8 are joined by one end to the same face of the rigid part 6, 16, 26 and by another end to the fixed support 2.

The rigid part 6, 16, 26 here forms a right-angled elbow, the elbow including two substantially perpendicular segments. The main flexible strip 4, is joined to the first segment, while the secondary strips 7, 8 are joined to the second segment. Thus, the main flexible strip 4 is substantially perpendicular to the secondary flexible strips 7, 8 of the translation table 5, 15, 25 in the rest position of the guide 1. The rest position is defined when the main 4 and secondary 7, 8 strips are straight, therefore not curved.

The flexible guide 1, 10, 20, 30, 40, 50, 60, 70, 80 further comprises means for adjusting the rigidity of the secondary flexible strips 7, 8.

In the first embodiment of FIG. 1, the means for adjusting the rigidity of the secondary flexible strips 7, 8 comprise pins 38 for bearing on the secondary strip(s) 7, 8 of the translation table 5. The pins 38 are movable to press at different locations along the length of the secondary flexible strips 7, 8. Thus, the effective length of the secondary flexible strips 7, 8 is changed by moving them. The shorter the effective length, the greater the rigidity. Thus, the flexible guide 1 can be adjusted to make it isochronous. The pins 38 are disposed on either side of each secondary strip 7, 8. In FIG. 1, three pins 38 are arranged on either side of the two strips 7, 8, one pin being arranged between the two secondary strips 7, 8. By moving the pins 38 away from the support 2, the length of the strips 7, 8 comprised between the support 2 and the pins 38 is blocked and no longer contributes to the movement of the movable element 3. Only the length of the strips 7, 8 comprised between the pins 38 and the rigid part 6 of the translation table 5 is effective in the movement of the movable element 3. The pins 38 are preferably displaceable simultaneously and press substantially at the same distance from the length of secondary flexible strips 7, 8.

Figure 2:
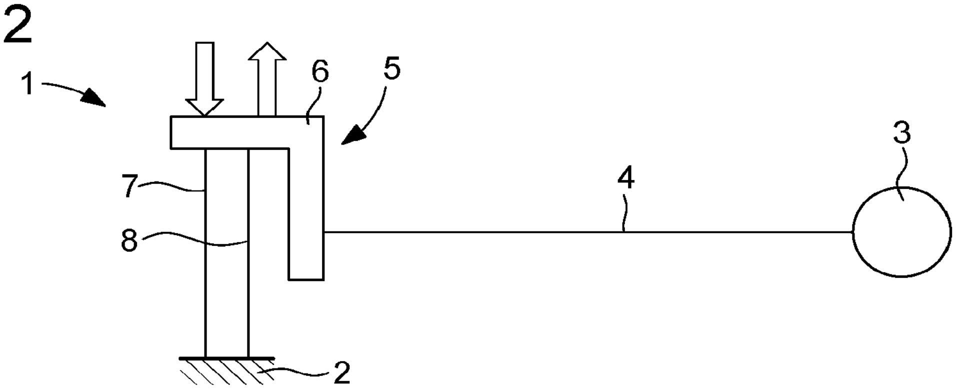

In the second embodiment, the flexible guide 10, 20, 30, 40, the means for adjusting the rigidity of the flexible strip comprise a member for bearing on the rigid part 6 of the translation table, so that the rigidity of the secondary strip(s) 7, 8 of the translation table 5 is modified. The general principle is shown in FIG. 2. The adjustment means are configured to apply a force or a torque to the rigid part 6 of the translation table 5 parallel to the secondary strips 7, 8. The intensity of such a force or such a torque makes the secondary strip(s) 7, 8 more or less rigid. The force or the torque is transmitted to the secondary flexible strips 7, 8 by the rigid part 6. Thus, the secondary strips 7, 8 are prestressed by the bearing member, which modifies the rigidity of the secondary strip(s) 7, 8. The greater the force applied, the greater the rigidity of the strips 7, 8. These adjustment means allow to adjust the isochronism of the flexible guide by modifying the rigidity of the secondary strips 7, 8.

Figure 3:
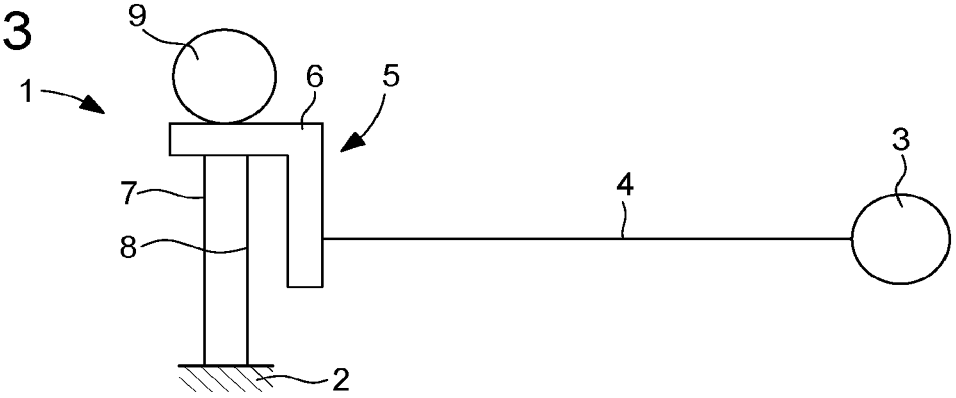
Figure 4:
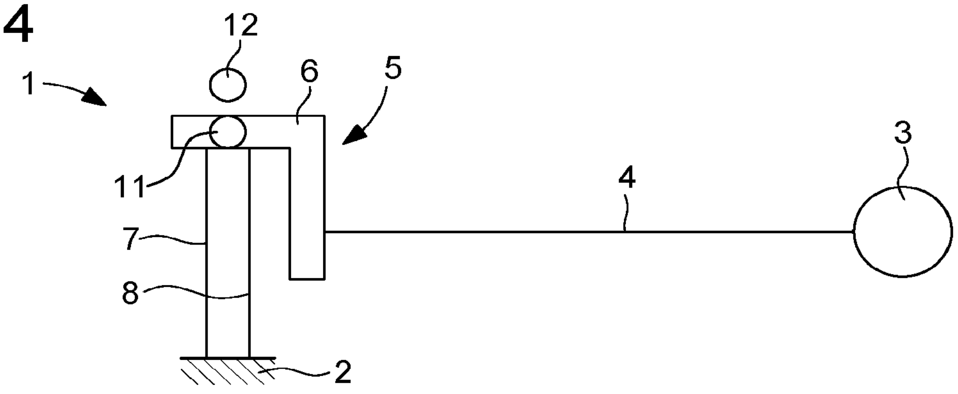

In FIG. 3, the first variant of the second embodiment consists in applying a more or less significant force by means of an eccentric screw 9. The screw head 9 is in contact with the rigid part 6 of the translation table 5 Thus, by turning the screw head 9, a more or less significant force is applied to the rigid part 6, because the screw head is not centred on the axis of the screw 9. This force prestresses the secondary strips of the translation table.

As a variant of the second embodiment, the means for adjusting the flexible guide 30 include magnets 11, 12. A first magnet 11 is arranged on the rigid part 6 of the translation table 5, and a second magnet 12 is disposed at a predefined distance from the first magnet 11 of the rigid part 6. The magnets 11, 12 are oriented so as to have identical poles facing each other. Thus, by being close to each other, the second magnet exerts a repulsive force on the first magnet. Alternatively, the poles can be of opposite sign to exert a tensile force on the rigid part 6. Thus, the rigidity of the secondary strips 7, 8 of the translation table 5, and therefore the isochronism, can be adjusted by modifying the distance between the two magnets 11, 12.

Figure 5:
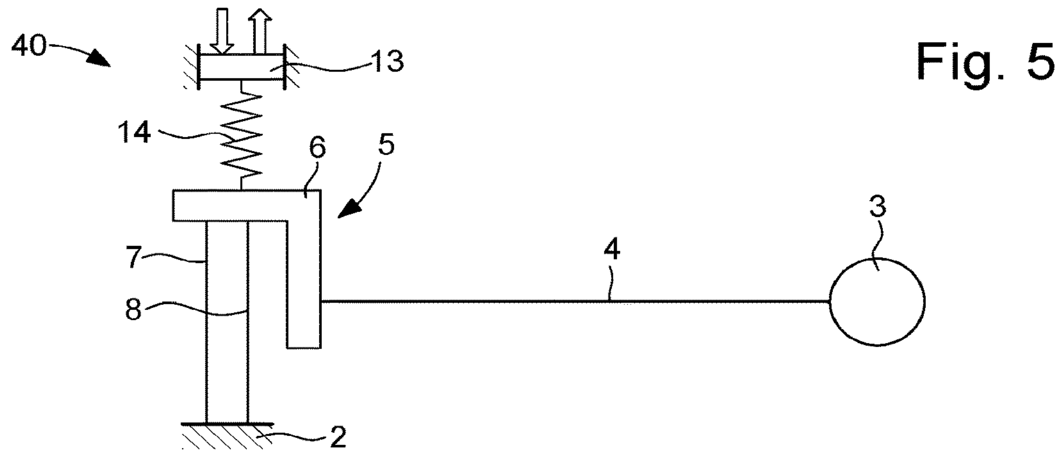

A third variant of the second embodiment of the flexible guide 40, shown in FIG. 5, comprises adjustment means provided with a spring 14 and a movable element 13. The spring 14 connects the movable element 13 to the rigid part 6 of the translation table 5. The movable element 13 is displaceable in multiple positions relative to the rigid part 13. Thus, the spring is more or less compressed, which then exerts a greater or lesser force on the rigid part 6 of the translation table 5.

Figure 6:
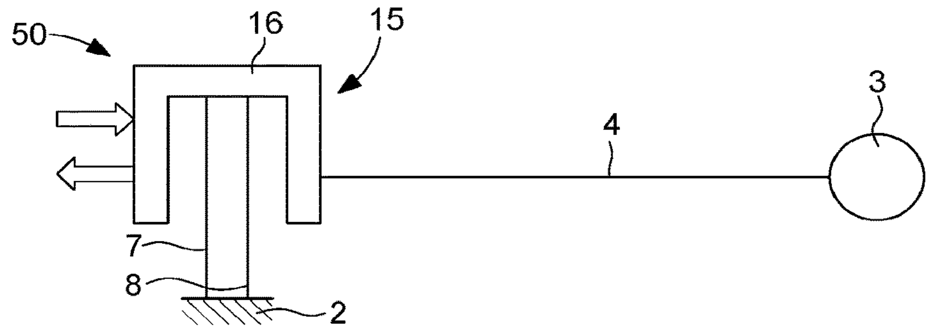
Figure 12:
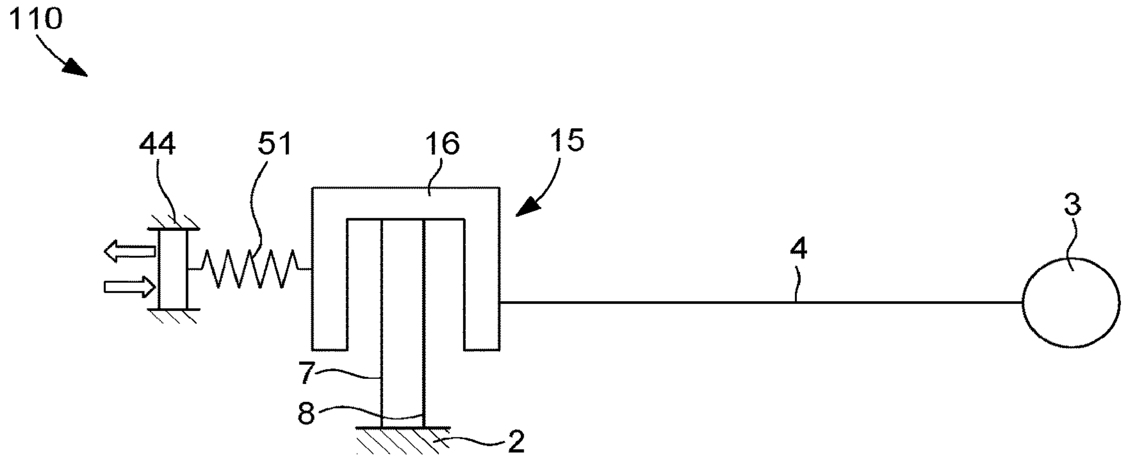
Figure 13:
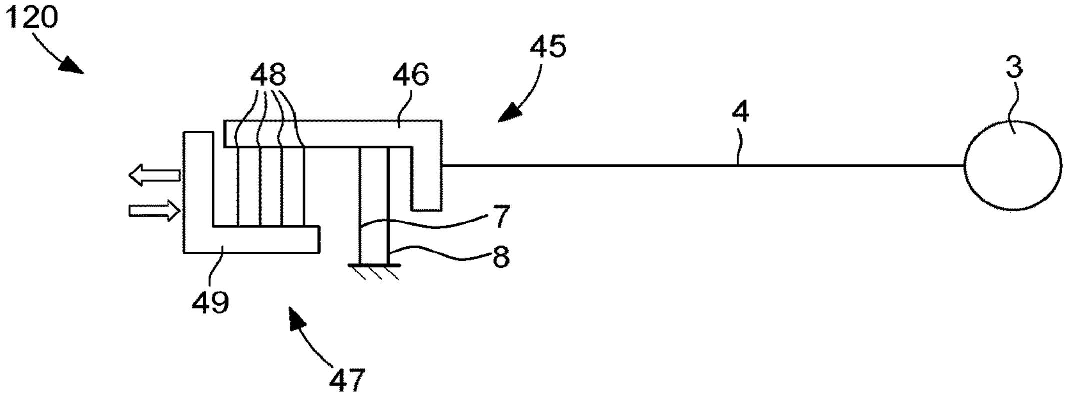

FIG. 6 shows an alternative to the variants of the second embodiment, wherein the force or the torque is exerted perpendicular to the secondary strips 7, 8, and parallel to the main strip 4. All the variants of the adjustment means of the second embodiment can be used to apply a force or a torque to the rigid part 16 of the translation table 15. Thus, the rate of the flexible guide 50 can be adjusted. Examples of variants of this embodiment are described in FIGS. 12 and 13.

Figure 7:
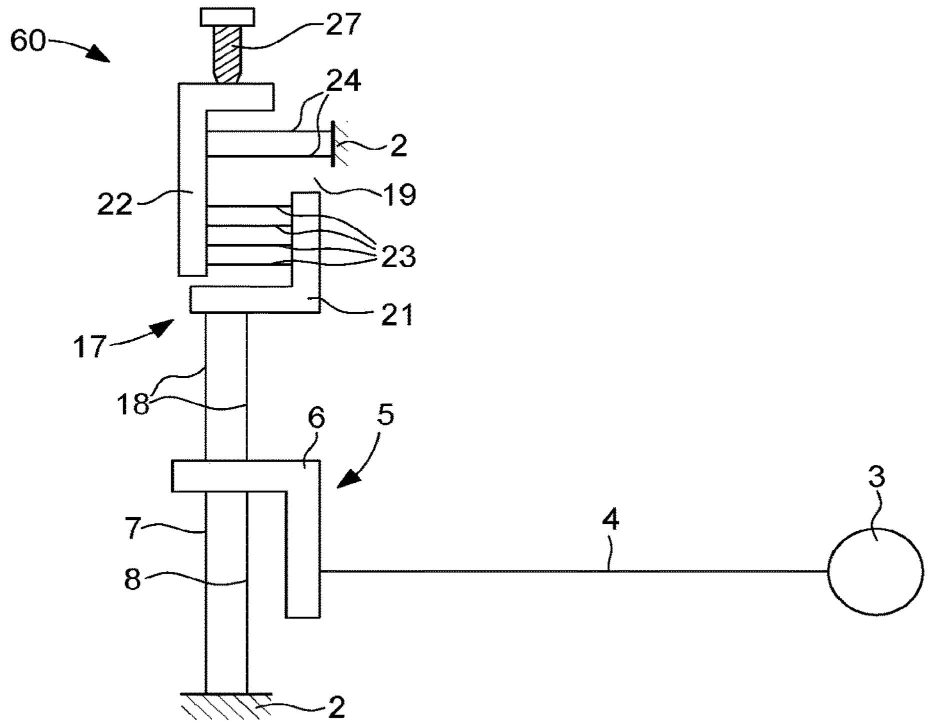

FIGS. 7 and 8 show two variants of a third embodiment wherein the flexible guide adjustment means 60, 70 comprise a second 17 and a third 19 translation table arranged to exert a force or a torque on the first translation table 5. The second translation table 17 is connected to the first translation table 5 by at least one tertiary flexible strip, preferably two tertiary flexible strips 18. The tertiary flexible strips 18 are substantially parallel to the secondary strips 7, 8 in the rest position. The second translation table 17 comprises a second rigid part 21, and the third translation table 19 comprises a third rigid part 22. The two rigid parts 21, 22 each have a wedge shape with two perpendicular segments. The two parts are arranged head-to-tail, a segment of the second rigid part 21 and a segment of the third part 22 being parallel in pairs, when the flexible guide 60, 70 is in the rest position. The third translation table 19 has the function of guiding the force or the torque in a direction directed towards the first translation table 5 and of forming a spring with the second translation table 17. The second translation table 17 has the function of transmitting the force or torque produced by the spring to the first translation table 5.

The third rigid part 22 is connected on the one hand to the fixed support 2 by at least one quaternary flexible strip, preferably two quaternary flexible strips 24, and on the other hand to the second rigid part 21 by at least one quinquennary flexible strip, preferably four quinquennary flexible strips 23. The quaternary 24 and quinquennary 23 flexible strips are substantially perpendicular to the secondary 7, 8 and tertiary 18 strips, when the flexible guide 60, 70 is in the rest position. The quaternary flexible strips 24 have the function of guiding the third rigid part 22 in a direction allowing to move it closer to or away from the second rigid part 21. The quinquennary flexible strips 23 have the function of forming the spring between the third rigid part 22 and the second rigid part 21, which transmits the force or the torque to the first rigid part 6 of the first translation table 5 by the tertiary flexible strips 18. The spring is prestressed by the displacement of the third rigid part 22 by the adjustment means.

The quaternary 24 and quinquennary 23 flexible strips are joined to a single segment of the corresponding rigid part 21, 22, the two segments of each rigid part being parallel. Thus, one segment of each rigid part 21, 22 is not joined by any flexible strip. These two segments are substantially parallel to the quaternary 24 and quinquennary 23 flexible strips, and substantially perpendicular to the secondary 7, 8 and tertiary 18 strips.

The adjustment means further include a movable bearing means on the third rigid part 22 of the third translation table 19. In the first variant embodiment of FIG. 7, the movable bearing means includes a screw 27 whose axis bears on the third rigid part 22 of the third translation table 19, while the variant of FIG. 8 includes an eccentric screw 28. The bearing means are configured to move the third rigid part 22 in a direction parallel to the secondary 7, 8 and tertiary 18 strips, and perpendicular to the primary 4, quaternary 24 and quinquennary 23 strips in the rest position of the guide. Thus, they allow to exert a more or less significant force or torque on the third translation table 19, which transmits said force or said torque to the second translation table 17, which in turn transmits it to the first translation table 5.

The fourth embodiment of FIG. 9 of the flexible guide 80 comprises a first translation table 25, a second translation table 34 connected to the first translation table 25, and adjustment means provided with a lever 32 connected to the second translation table 34 via a flexible element 29. The lever 32 comprises a fork 33 at a first end, and is connected to the flexible element 29 at its second end. The lever 32 is connected to the support 2 by two flexible strips 35 arranged on either side of the lever. The fork 33 allows to move the lever 32 in a direction of the plane of the flexible guide 80.

The first translation table 25 comprises, in addition to elements identical to those of the other embodiments, a rigid part 26 provided with a third segment substantially perpendicular to the first segment, the third segment being substantially parallel to the first segment, but offset towards the second translation table 34. The second rigid part 31 of the second translation table 34 forms a wedge with two substantially perpendicular segments. The first segment is substantially parallel to the third segment of the first rigid part 26 of the first translation table 25. The second segment is substantially parallel to the second segment of the first translation table 25. The second translation table 34 comprises tertiary flexible strips, here four tertiary flexible strips 37, connecting the third segment of the first translation table 25 to the first segment of the second translation table 34. The tertiary flexible strips 37 are substantially perpendicular to the secondary flexible strips 7, 8. The flexible element 29 is connected, on the one hand to the lever 32 by a first quaternary flexible strip 36, and on the other hand to the second segment of the second translation table 34 by a second quaternary flexible strip 37. The flexible element 29 can for example be a flexible flat strip or a rigid bar provided with a neck which is thinned at each end to allow its bending.

By moving the fork 33, the lever 32 applies to the flexible element 29 a force or a torque transmitted to the second translation table 34.

Figure 10:
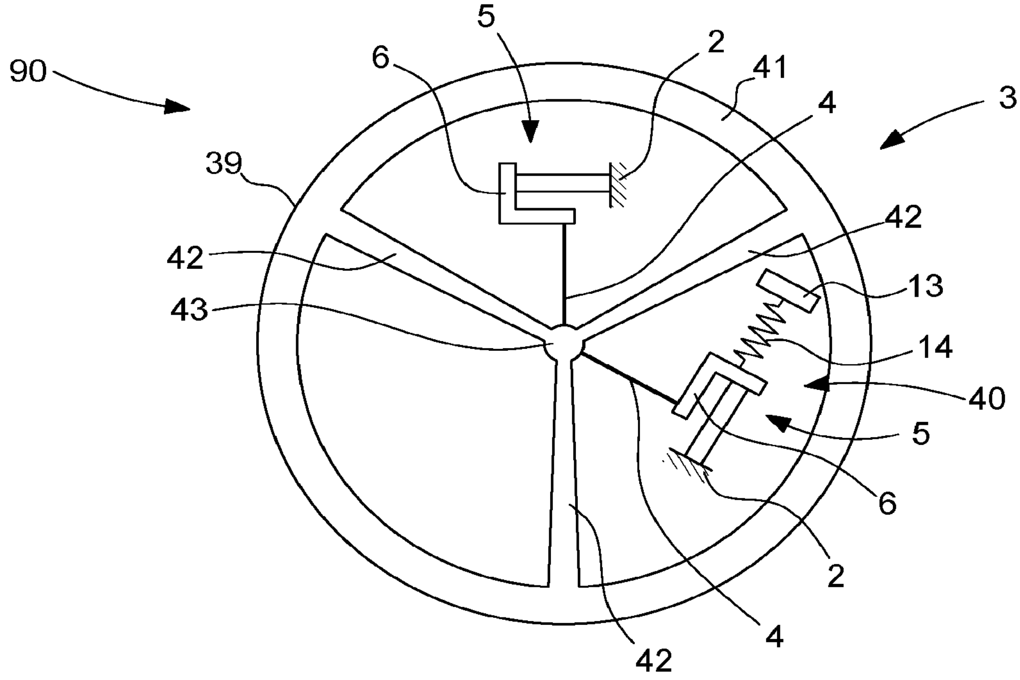

FIG. 10 shows a first embodiment of a pivot 90 for a rotary resonator mechanism, in particular of a horological movement. The pivot 90 is arranged substantially in a plane. The pivot 90 comprises a fixed support 2, an element 3 movable relative to the fixed support 2 and two main flexible strips 4 each connecting the movable element 3 to the support 2. The main flexible strips 4 allow the movable element 3 to move relative to the fixed support 2. By bending the main flexible strips 4, the movable element 3 can move relative to the support 2 in a rotary movement on itself about a centre of rotation. The main strips 4 are preferably of the same length and distributed angularly around a central part of the movable element 3.

According to the invention, the pivot 90 comprises two translation tables 5, each translation table 5 being joined to one end of a different main flexible strip 4. In this embodiment, the translation table 5 is arranged in series between the fixed support 2 and said corresponding main flexible strip 4. The translation table 5 is joined to the fixed support 2 and to a first end of the corresponding main flexible strip 4, the main flexible strip 4 being joined to the central part by a second end.

Thus, the pivot 90 comprises two pairs, each pair being formed of a main flexible strip 4 and a translation table 5. The pairs are distributed angularly around the central part, each main strip 4 being joined by one end to the central part. The pairs, in particular the main strips 4, for example form an angle of approximately 120° therebetween. The central part is for example a portion of a circular cylinder. In this embodiment, the movable element 3 comprises the central part. The first translation tables 5 are the same as those described in the embodiments of the flexible guides described above.

The movable element 3 further comprises a balance 39, which is in the shape of a ring. The balance 16 includes an outer annular part 41 and arms 42, here three arms, joining the annular part 41 at an axial junction 43 relative to the annular part 41. The arms 42 are concentric and of the same length. The balance 39 is assembled on the central part by the junction 43. Preferably, the central part and the junction 43 are made integrally. Thus, the balance 39 is centred relative to the central part. In this variant, the balance is made of the same material, that is to say it is made integrally.

When the balance 39 is in movement, followed, in the plane of the balance 39, by a periodic rotational movement in one direction, then in the other direction, around an axis passing through the junction 43 and the central part. The main flexible strips 4 bend and act as a spring for returning the balance 39 to rotate it in the other direction and vice versa. The translation tables 5 allow the main strips 4 to move longitudinally as they bend. The rigid parts 6 of the translation tables 5 move closer to the central part thanks to the secondary strips when the main strips 4 bend, and move away from the central part when the main strips 4 become straight. Thus, an isochronism of the movement of the balance 39 is maintained.

Figure 11:
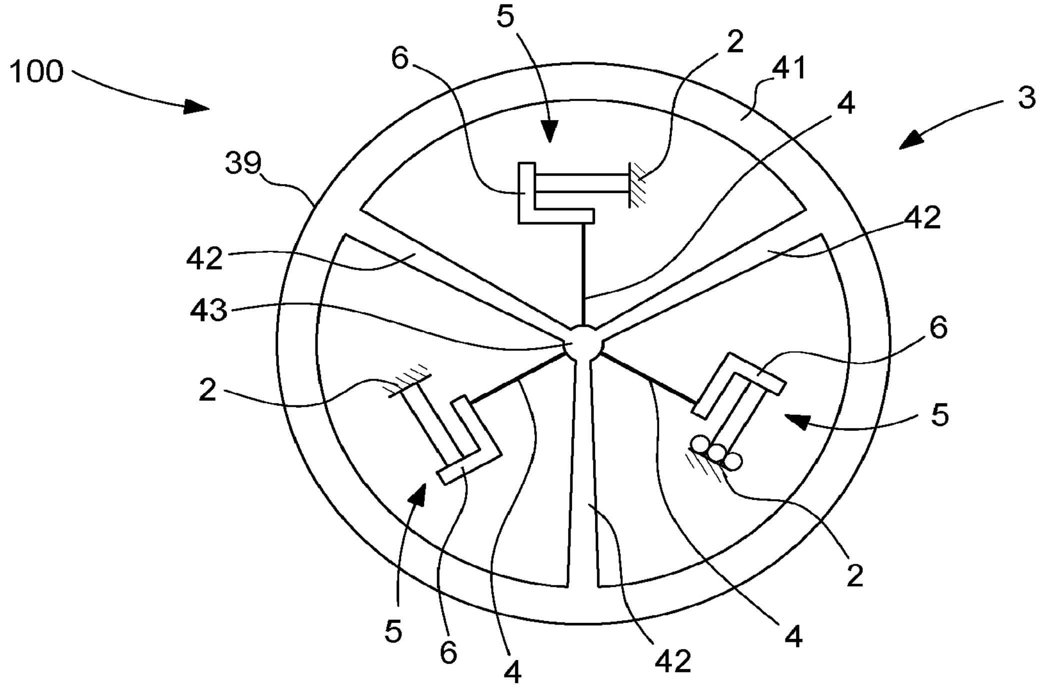

FIG. 11 shows an embodiment of a symmetrical pivot 100 for a rotary resonator mechanism, in particular of a horological movement. The symmetrical pivot 100 is arranged substantially in a plane. The symmetrical pivot 100 comprises a fixed support 2, an element 3 movable relative to the fixed support 2 and three main flexible strips 4 each connecting the movable element 3 to the support 2. The main flexible strips 4 allow the movable element 3 to move relative to the fixed support 2. By bending the main flexible strips 4, the movable element 3 can move relative to the support 2 in a rotary movement on itself about a centre of rotation. The main strips 4 are preferably of the same length and angularly distributed uniformly around a central part of the movable element 3.

According to the invention, the symmetrical pivot 100 comprises translation tables 5, each translation table 5 being joined to one end of a different main flexible strip 4. In this embodiment, the translation table 5 is arranged in series between the fixed support 2 and said corresponding main flexible strip 4. The translation table 5 is joined to the fixed support 2 and to a first end of the corresponding main flexible strip 4, the main flexible strip 4 being joined to the central part by a second end.

Thus, the symmetrical pivot 100 comprises three pairs, each pair being formed of a main flexible strip 4 and a translation table 5 arranged in series. The pairs are distributed angularly around the central part, each main strip 4 being joined by one end to the central part. The pairs, in particular the main strips 4, form an angle of approximately 120° therebetween. The central part is for example a portion of a circular cylinder. In this embodiment, the movable element 3 comprises the central part. The first translation tables 5 are the same as those described in the embodiments of the flexible guides described above.

The movable element 3 further comprises a balance 39, which is in the shape of a ring. The balance 16 includes an outer annular part 41 and arms 42, here three arms, joining the annular part 41 at an axial junction 43 relative to the annular part 41. The arms 42 are concentric and of the same length. The balance 39 is assembled on the central part by the junction 43. Preferably, the central part and the junction 43 are made integrally. Thus, the balance 39 is centred relative to the central part. In this embodiment, the balance is formed from the same material, that is to say it is made integrally.

When the balance 39 is in movement, followed, in the plane of the balance 39, by a periodic rotational movement in one direction, then in the other direction, around an axis passing through the junction 43 and the central part. The main flexible strips 4 bend and act as a spring for returning the balance 39 to rotate it in the other direction and vice versa. The translation tables 5 allow the main strips 4 to move longitudinally as they bend. The rigid parts 6 of the translation tables 5 move closer to the central part thanks to the secondary strips when the main strips 4 bend, and move away from the central part when the main strips 4 become straight. Thus, an isochronism of the movement of the balance 39 is maintained.

The embodiments of the pivots 90, 100 of FIGS. 10 and 11 further comprise means for adjusting the anisochronism on one of the translation tables 5.

In the embodiment of the pivot 90 of FIG. 10, the adjustment means are those described in the third variant of the second embodiment of the flexible guide 40 of FIG. 5. The adjustment means comprise a spring and a displaceable retaining element.

In the embodiment of the symmetrical pivot 100 of FIG. 11, the adjustment means are those described in the first embodiment of the flexible guide 1 of FIG. 1. The adjustment means comprise pins for modifying the effective length of the strips.

Other embodiments are also possible, although not shown. Thus, it is possible to arrange adjustment means on several translation tables of the same symmetrical pivot.

In another variant, the translation tables are arranged in series between the main flexible strips and the movable element.

In the first variant of the third embodiment of the flexible guide 110, the rigid part 16 of the translation table 15 of the flexible guide 50 has a U-shape, and comprises a third segment parallel to the secondary strips 7, 8 in the rest position. The first and the third segment are arranged on either side of the secondary strips 7, 8 which penetrate inside the U to be joined to the second segment. The adjustment means are provided with a spring 51 and a movable element 44. The spring 51 connects the movable element 44 to the rigid part 16 of the translation table 15. In particular, the spring 51 is arranged to stretch or compress parallel to the main strip 4 and perpendicular to the secondary strips 7, 8. The spring 51 is connected to the third segment of the rigid part 16. The movable element 44 is displaceable in multiple positions relative to the rigid part 16. Thus, the spring 51 is stretched or compressed to a greater or lesser extent, which then exerts a greater or lesser force on the rigid part 16 of the translation table 15.

In the second variant of the third embodiment of the flexible guide 120, the adjustment means comprise a second translation table 47 provided with a second rigid part 49 and tertiary flexible strips 48. The rigid part 46 of the first translation table 45 has the shape of a right-angled elbow, the elbow including two substantially perpendicular segments. The main flexible strip 4, is joined to the first segment, while the secondary strips 7, 8 are joined to the second segment. The second segment of the rigid part 46 is elongated. The second rigid part 49 of the second translation table 47 also has the shape of a right-angled elbow, the elbow including two substantially perpendicular segments. The first segment of the second rigid part 49 is substantially parallel to the first segment of the first rigid part 46, while the second segment of the second rigid part 49 is substantially parallel to the first segment of the first rigid part 46. The segments of the first and second rigid parts 46, 49 face each other in pairs. The flexible guide 120 comprises at least one tertiary strip, preferably four tertiary strips 48, connecting the second segments of the two rigid parts 46, 49 with one another. The tertiary strips 48 are substantially parallel to the secondary strips 7,8 and substantially perpendicular to the main strip 4, in the rest position of the flexible guide 120.

The invention also relates to a resonator mechanism, in particular for a horological movement, not shown in the figures. The resonator mechanism is provided with a flexible guide or a pivot according to one of the embodiments described above.

Naturally, the invention is not limited to the embodiments described with reference to the figures and variants could be considered without departing from the scope of the invention. It is possible in particular to imagine a number of pairs formed of a main flexible strip and a translation table, which is higher or lower than the examples described.

The invention claimed is:

1. A flexible guide for a rotary resonator mechanism, the guide comprising:
- a fixed support;
- an element movable relative to the fixed support;
- at least one main flexible strip allowing the movable element to move relative to the fixed support by bending the main flexible strip(s) in a rotary movement about a centre of rotation, the flexible guide being arranged substantially in a plane;
- at least a first translation table joined to one end of the main flexible strip, so that the first translation table is configured to move in translation at least in part under the effect of the bending of the main flexible strip; and
- means for adjusting the rigidity of the first translation table,
- wherein the first translation table includes at least one secondary flexible strip, the at least one secondary flexible strip is perpendicular to the main flexible strip in the rest position of the flexible guide.

2. The flexible guide according to claim 1, wherein the first translation table comprises a first rigid part, the secondary flexible strip being joined by one end to the rigid part, and by another end, either to the fixed support, or to the movable element.

3. The flexible guide according to claim 1, wherein the adjustment means comprise pins for modifying the effective length of the secondary flexible strip(s).

4. The flexible guide according to claim 1, wherein the adjustment means comprise a member for applying a force or a torque to the rigid part of a translation table.

5. The flexible guide according to claim 4, wherein the force or the torque is directed parallel to the secondary flexible strips in the rest position of the flexible guide.

6. The flexible guide according to claim 4, wherein the force or the torque is directed perpendicular to the secondary flexible strips in the rest position of the flexible guide.

7. The flexible guide according to claim 4, wherein the adjustment means comprise a second translation table arranged between the application member and the rigid part of the first translation table.

8. The flexible guide according to claim 7, wherein the second translation table comprises a second rigid part, and at least one tertiary flexible strip, connecting the second rigid part to the first rigid part of the first translation table, the tertiary strip(s) being substantially perpendicular or parallel to the main flexible strip in the rest position of the flexible guide.

9. The flexible guide according to claim 7, wherein the adjustment means comprise a third translation table arranged between the application member and the second rigid part of the second translation table.

10. The flexible guide according to claim 9, wherein the third translation table comprises a third rigid part, at least one quaternary strip, connecting the second rigid part to the support or to the movable part, and at least one quinquennary strip, connecting the third rigid part to the second rigid part of the second translation table, the quaternary and quinquennary strips being substantially parallel to the main flexible strip in the rest position of the flexible guide.

11. The flexible guide according to claim 10, wherein the rigid part forms an elbow, so that strips of different type joining the rigid part of the first or second translation tables are perpendicular to each other.

12. The flexible guide according to claim 4, wherein the application member comprises an eccentric screw to press on the rigid part of the translation table.

13. The flexible guide according to claim 4, wherein the application member includes a movable element and a spring joining the movable element to the rigid part.

14. The flexible guide according to claim 4, wherein the application member comprises a lever and a flexible element, the lever allowing to apply a predefined force or torque to the rigid part of the translation table with the flexible element.

15. The flexible guide according to claim 4, wherein the application member includes magnets, one of the magnets being arranged on the rigid part of the translation table.

16. A pivot, comprising at least two flexible guides, each guide being formed of a main strip and a translation table connected to a support or to a movable element, the pairs being distributed angularly around a central part, each main strip being joined by one end to the central part, at least one of the flexible guides being defined according to claim 1.

17. The pivot according to claim 16, wherein the movable element comprises the central part.

18. The pivot according to claim 16, wherein the movable element comprises a lever centred on the central part.

19. A rotary resonator mechanism for a horological movement, comprising a flexible guide according to claim 1.

* * * * *